(12) United States Patent
Feraud

(10) Patent No.: US 8,931,080 B2
(45) Date of Patent: Jan. 6, 2015

(54) METHOD AND SYSTEM FOR CONTROLLING THE EXECUTION OF A FUNCTION PROTECTED BY AUTHENTIFICATION OF A USER, IN PARTICULAR FOR THE ACCESS TO A RESOURCE

(75) Inventor: Alban Feraud, Paris (FR)

(73) Assignee: Oberthur Technologies, Colombes (FR)

( * ) Notice: Subject to any disclaimer, the term of this patent is extended or adjusted under 35 U.S.C. 154(b) by 114 days.

(21) Appl. No.: 13/280,385

(22) Filed: Oct. 25, 2011

(65) Prior Publication Data

US 2012/0102565 A1 Apr. 26, 2012

(30) Foreign Application Priority Data

Oct. 26, 2010 (FR) ...................................... 10 58771

(51) Int. Cl.
*G06F 21/00* (2013.01)
*G06F 21/34* (2013.01)

(52) U.S. Cl.
CPC ........ *G06F 21/34* (2013.01); *G06F 2221/2111* (2013.01); *G06F 2221/2137* (2013.01); *G06F 2221/2143* (2013.01)
USPC ........ 726/18; 726/6; 726/21; 726/26; 726/27; 380/277; 380/279

(58) Field of Classification Search
USPC .......................................................... 726/18
See application file for complete search history.

(56) References Cited

U.S. PATENT DOCUMENTS

| | | | | |
|---|---|---|---|---|
| 6,405,369 | B1 * | 6/2002 | Tsuria | 725/6 |
| 6,735,575 | B1 * | 5/2004 | Kara | 705/50 |
| 8,015,597 | B2 * | 9/2011 | Libin et al. | 726/5 |
| 8,776,216 | B2 * | 7/2014 | Boccon-Gibod et al. | 726/21 |
| 2010/0150351 | A1 * | 6/2010 | Sutton et al. | 380/277 |
| 2010/0274859 | A1 * | 10/2010 | Bucuk | 709/206 |

FOREIGN PATENT DOCUMENTS

| | | |
|---|---|---|
| EP | 2037651 | 3/2009 |
| EP | 2199992 | 6/2010 |
| FR | 2906905 | 4/2008 |

OTHER PUBLICATIONS

French Search Report dated May 31, 2011, corresponding to the Foreign Priority Application No. FR1058771.

* cited by examiner

*Primary Examiner* — Jason Lee
(74) *Attorney, Agent, or Firm* — Young & Thompson

(57) ABSTRACT

A method and system for controlling the execution of a function protected by authentication of a user and which is provided for example for the access to a resource. The method includes inputting, by the user, of personal data using an input device, authenticating the user with the input personal data for authorizing or not authorizing the execution of the function; in a secure card connected to the input device, storing limited validity authentication data dependant on the input data; when the card is connected to a processing device by which the user generates a message whose processing implements the function, using the stored data, taking into account the limited validity, to authorize or not authorize the execution of that function.

15 Claims, 4 Drawing Sheets

METHOD AND SYSTEM FOR CONTROLLING THE EXECUTION OF A FUNCTION PROTECTED BY AUTHENTIFICATION OF A USER, IN PARTICULAR FOR THE ACCESS TO A RESOURCE

This application claims priority from French application No. 1058771 filed on Oct. 26, 2010, which application is incorporated herein by reference.

FIELD OF THE INVENTION

The present invention concerns a method and a system for controlling the execution of a function protected by authentication.

CONTEXT OF THE INVENTION

A function is said to be protected by authentication when its execution depends on the result of an authentication, generally of a user.

These functions are in particular used for accessing resources such as systems, networks, applications, services on a card or remote server, and stored data.

Such a function may in particular correspond to commands implemented by an ad hoc entity on reception of a message requesting the access to a resource.

The authentication of the user involving such a function to access one of those resources is conventionally carried out on a computer system. It generally consists of a step of inputting, by the user, personal data for identification or authentication, using an input device, then of a step of authenticating the user based on the input personal data, for example by comparison with personal data pre-recorded in the system, to generate an authorization or refusal to execute the protected function enabling the access to a resource.

In case of authorization, the protected function is executed and the access to the resource is obtained for the user.

By way of illustration, the personal data for identification or authentication may be a password, a PIN (for "Personal Identification Number") or biometric data.

Identity theft is a recurrent problem which affects the security of the systems for access to a resource by authentication that process those functions protected by authentication.

In numerous strategies of attack, identity theft consists in a malicious person stealing the particularly sensitive personal data of users for identification or authentication, generally by placing malicious software between the input device and the processing software that carries out the authentication based on the input personal data.

The malicious software receives the input sensitive data, makes a copy thereof, then communicates those data to the processing software. In this way, neither of the two parties involved in the access by authentication (the user and the processing software) can suspect the presence of the malicious software.

Possessing the sensitive personal data and knowing the resource to which it gives access (in particular because the computer system enables the access to a particular resource, for example a cash dispenser) enables the malicious person then to re-access the resource, under a false identity, that of the robbed user.

These attack strategies are known by the term "man in the middle attack". They are particularly dangerous when they enable the theft of personal data for identification or authentication for the access to services for example involving financial transactions. They are generally implemented in relation to untrusted input terminals, for example payment terminals in shops or cash dispensers.

There is thus a need to improve the mechanisms for verifying the execution of functions protected by authentication, in particular when they enable the access to resources, in particular to counter such attack strategies.

SUMMARY OF THE INVENTION

In this context, the invention concerns in particular a method of controlling the execution of a function protected by authentication, comprising the following steps:

storing, in a limited validity structure, personal authentication data dependent on input personal data, on inputting the latter by a user on an input device;

verifying the validity of the limited validity structure before using the personal authentication data that it contains to generate an authorization or a refusal to execute a function implemented in the processing of a message generated by a processing device that is distinct from the input device.

According to the invention, the input of personal data and their processing for the access to a resource by the execution of the protected function may be dissociated in time or in space. This is made possible by the storage in a limited validity structure, in accordance with the invention, of personal authentication data dependent on the input data, thus enabling the link to be made between the two operations of inputting and processing.

Furthermore, these two operations are each carried out in relation to distinct devices: the input device for the first operation, and the processing device for the second. Thus, the user does not need to perform an input of sensitive data on the processing device, which prevents any malicious person having tampered with that device from retrieving the sensitive data from the input means on that device.

According to the invention, the dissociation of the two operations does not enable the "man in the middle" to both retrieve the sensitive data and to know the resource to which they enable access (that is to say the corresponding protected function). As will be seen below, the user may use an input device in which he trusts, for example a device which is specific to him. He is thus no longer constrained to input personal data on a third party device of doubtful trustworthiness.

As regards the limited validity of the personal authentication data, this enables the efficiency of the invention to be ensured while avoiding potentially stolen sensitive data from being used indefinitely, for example over time or space, to enable the malicious person to have the function executed whose execution is protected by those data, and thus to access the corresponding protected resource.

In the case of temporary validity, the duration of validity may be set on the basis of the risks incurred, and of the functions and resources concerned.

Similarly, a spatial validity defining a maximum distance for use of the structure from an initial point may be based on a GPS measurement.

Thus, improvement is obtained in controlling the execution of the functions protected by authentication and the possible access to a resource arising therefrom.

According to one aspect of the invention, the method comprises the following steps:

inputting, by the user, of the personal data using the input device;

authenticating the user on the basis of the input personal data to generate the authorization or the refusal to execute the protected function;

executing the function in case of authorization;

wherein:

the steps of storing and verifying are implemented in a memory module respectively connected to the input device at the time of the inputting and storing steps, and to the processing device at the time of the verifying and executing steps;

said limited validity structure comprises personal authentication data of validity limited by association of a duration of validity with the personal authentication data.

Although it is possible for the connection to be physical, it is above all a logical connection enabling communication to be provided between the device and module then involved.

Only the memory module, which may be a conventional secure microprocessor card, manipulates the limited validity data structure here, and thus the limited validity personal authentication data contained by that structure. By virtue of the secure techniques which are widely known for this type of module or card, these data may be managed as internal secret keys, and are thus manipulated in secure manner during the two phases of inputting and exploitation for authorizing or not authorizing the execution of the protected function.

In an embodiment, the verifying of the validity of the structure for using the personal authentication data comprises verifying the time that has elapsed since the generation of that limited validity structure compared to the duration of validity that is associated with the personal authentication data. In other words, this provision consists in verifying that the limited validity personal authentication data are still valid when they are used for the purpose of obtaining an authorization for executing the function. Large scale re-use of these limited validity sensitive data by a malicious person is thereby avoided. According to some embodiments, in particular certain described below, the generation of the authorization or the refusal may as a variant be dependent on the time lapsed since the end of supplying electrical power to the memory storing the limited validity structure.

In an embodiment, generating the authorization or the refusal is dependent on a verification of the personal data input with reference data, the result of the verification being obtained using said personal authentication data stored in the stored limited validity structure. In conventional manner, the authentication of the user here comprises the verification of the input personal data for the purpose of authorizing or not authorizing the access to the resource. The present provision enables these mechanisms to be maintained by virtue of the use of the limited validity personal authentication data which are stored in the memory module according to the invention.

According to a particular feature of the invention, the method comprises a step of comparing input personal data with personal data pre-recorded in the memory module, and the personal authentication data stored in the limited validity structure comprise the result of the comparison. In this configuration, the authentication operations are carried out in the input device but the authorization based on that authentication has not yet be given. To be precise, only the result of the authentication (whether or not the comparison of the input data is positive) is provided as an item of limited validity sensitive data according to the invention. Thus communication of the personal data as input (password, PIN code, etc.) to a processing device is avoided.

As a variant, the personal authentication data stored in the limited validity structure comprise the input personal data, and their use comprises a sub-step of comparing the personal authentication data stored in the limited validity structure with personal data pre-recorded in the memory module. This provision makes it possible to simplify the operations carried out by the input device, in particular if it has limited processing resources or if, for the needs of the comparison, it proves necessary for example to access a secure database.

In an embodiment of the invention, the duration of validity associated with the personal authentication data is accounted for by the discharge of an electrical capacitance provided in the memory module. The electrical capacitance thus serves at a time counter. This configuration is in particular simple to implement in any type of electronic entity capable of storing the limited validity data according to the invention.

In particular, the personal authentication data are stored in a volatile memory of the memory module, which memory is temporarily powered by said electrical capacitance. The control by authentication according to the invention is made still more secure by this provision, since the limited validity sensitive data are automatically deleted at the expiry of the duration of validity, due to the very nature of the volatile memory. Furthermore, this configuration is simple to implement.

In another embodiment, the personal authentication data are stored in a volatile memory of the memory module, and a duration of validity associated with them is defined by the properties of evanescence of the volatile memory when its power supply is cut. This provision has the advantage of not relying on specific means for accounting for the duration of validity. More particularly, due to the evanescence of the data in this type of volatile memory, it is ensured that the limited validity sensitive data are automatically erased at the expiry of the duration of evanescence. Volatile memories will thus be chosen whose corresponding properties of evanescence are appropriate for the duration of life or validity desired for the personal authentication data generated.

In still another embodiment, the personal authentication data are stored in a volatile memory of a memory module, which is continuously supplied with power during the control of the execution of the protected function or in a re-writable memory, for example of EEPROM type (EEPROM for "Electrically-Erasable Programmable Read-Only Memory"), and a duration of validity associated with them is defined by storing a temporal quantity, for example a validity duration and validity start time, or a validity end time alone, in a variable which is associated in memory with the personal authentication data. Sufficient elements are thus provided for the memory module to be able to verify that the personal authentication data used for obtaining the authorization are still valid, by comparison of the validity duration or validity end time (which is a date including the hour, minute, etc.) with the time that has elapsed since the generation of those data.

According to a feature of the invention, the use, by the memory module, of the limited validity personal authentication data comprises verifying the validity of those data by using the stored temporal quantity and reference temporal data which are provided to it by the processing device. This provision enables a common reference to be used to evaluate the temporal limit for validity. It may in particular be a clock common to the different devices (for example a network clock), or a clock specific to those devices.

In an embodiment, the protected function is a command implemented, on reception of a message from the processing device, by a microprocessor module storing the limited validity structure. According to various approaches, the protected command may be directly indicated in the message provided or be a sub-command which depends on such a command indicated in the message (for example a sub-command called on execution of that command).

According to another feature of the invention, a memory module storing the limited validity structure and the personal authentication data that it contains is removable, and is placed in the input device at the time of the input and placed in the processing device at the time of the verification of the validity of the structure and at the time of the use of the limited validity personal authentication data. This provision is highly convenient for the user, who, for the purposes of controlling the execution of a function protected by authentication in order for example to access a resource, can transport or supply just the removable memory module on which are recorded the sensitive data resulting from the input and which are necessary for the authentication.

As a variant, a memory module storing the limited validity structure and the personal authentication data that it contains is physically linked with the input equipment during the control and execution of the protected function (that is to say during the two steps of inputting and of processing), and the processing equipment communicates with the memory module by contactless communication. This configuration proves to be simple to use for the user, since the user may simply input his personal data confidentially on an input device which is specific to him (for example his mobile telephone) and present the latter to the processing device for performing the subsequent operations necessary for controlling the execution of the function for example for accessing a corresponding resource. This contactless communication also covers the case where that communication passes via the input device in which the memory module is embedded. This is for example the case when a SIM card (SIM standing for "Subscriber Identity Module") in a mobile telephone uses an NFC controller (NFC standing for "Near Field Communication") of the mobile telephone to communicate with an external processing device.

According to a particular feature, the memory module storing the limited validity structure and the personal authentication data is a secure microprocessor card. This provision is advantageous in that, in a conventional manner, the microprocessor card comprises means for making the sensitive data secure and also efficient means for communicating with one or other of the input and processing devices.

In particular, the communication between the input device or the processing device and said microprocessor card is contactless. In this way, those devices and the card (memory module) are connected for each of the operations necessary for controlling the execution of the function. The communication channel may be in accordance with the NFC standard, with the ISO 14443 standard or with a similar standard.

As a variant, in particular if the microprocessor card is removable during these operations, communication by contact may be provided between the input device or the processing device and said microprocessor card.

In an embodiment, the processing of the message from the processing device generates a response comprising at least one response value which depends on the authorization or the refusal generated. This configuration finds numerous applications, which are generally defined in the success or failure of an access requested by the user (for example a payment successfully made or not made, the access to a secure account, etc.).

In certain applications as a variant, the response value may however be independent of the authorization or of the refusal generated (for all or some of the protected functions). As illustrated below, the execution of a protected function may simply perform the updating of an internal state of the memory module, such as a fraudulent access detection flag.

In an embodiment of the invention, the user inputs at least one item of information representing an item of financial data, and said item of information is stored in the limited validity structure in common with the personal authentication data, for the purposes of a later financial operation (for example a transaction) the access to which depends on the authorization or the refusal generated. By virtue of the invention, it is thus possible to make secure all the data input by the user for the purpose of a later operation, whether or not that data is sensitive. This provision increases the confidentiality of those data in this way.

In an embodiment of the invention, the input device is equipment trusted by the user. This configuration benefits from the full efficiency of the invention, since the input operation is strongly protected here. Thus, as a malicious person is unable to access that trusted device he is unable to retrieve the personal data directly input by the user.

In particular, the input device is a mobile telephone of the user.

In a complementary manner, the invention concerns a memory module comprising at least one memory and a processor for executing instructions, the memory module being configured for:
  storing, in a limited validity structure, personal authentication data which are dependent on personal data input by a user and received from an input device to which the memory module is linked (that is to say during the input);
  verifying the validity of the limited validity structure before using the personal authentication data that it contains to generate an authorization or a refusal to execute a function protected by authentication and implemented in the processing of a message received from a processing device that is distinct from the input device.

Similarly, the invention concerns a system for controlling the execution of a function protected by authentication of a user, comprising:
  an input device for inputting personal data by the user;
  a processing device that is distinct from the input device and adapted to generate, under the action of the user, a message to process;
  a memory module comprising at least one memory and a processor, and which is configured to authenticate the user on the basis of the input personal data so as to generate an authorization or a refusal to execute a protected function implemented in the processing of said message;
  in which the memory module is configured for:
  when it is connected to the input device, generating and storing, in its memory, limited validity personal authentication data which are dependent on the input personal data and associating with them a validity parameter; and
  when it is connected to the processing device, using the stored personal authentication data for generating the authorization or the refusal to execute the function depending on the associated validity parameter.

The memory module and the authentication system have similar advantages to those of the method set out above. In particular, they make it possible to dissociate the operations of inputting sensitive data and of processing those data for the purpose of obtaining an authorization to execute the protected function, procuring increased security against the attacks by the man in the middle.

Optionally, the memory module or the system may comprise means relating to the features of the method set forth above, and in particular an electrical capacitance used for counting down a duration of validity, a volatile memory which automatically erases itself on expiry of said duration, a fixed or removable memory, a microprocessor card for storing the limited validity personal authentication data according to the invention between the various devices, contactless or with contact means for communication between the microprocessor card and the various devices.

In particular, these devices may comprise means for inputting, by the user, of the personal data using the input device; authentication means for authenticating the user on the basis of the input personal data so as to generate the authorization or the refusal to execute the protected function; execution means for executing the function in case of authorization. Furthermore, the memory module configured for the storage and the verification may be respectively connected to the input device at the time of the input and the storage, and to the processing device at the time of the verification and of the execution. In this case, it may be provided for said limited validity structure to comprise personal authentication data of validity limited by association of a duration of validity with the personal authentication data.

Moreover, according to another embodiment, the personal authentication data stored in the limited validity structure may comprise the input personal data. The memory module or the system may then, in order to use those data, comprise a means for comparing the personal authentication data stored in the limited validity structure with the personal data pre-recorded in the memory module.

According to another embodiment, said limited validity structure comprises personal authentication data of validity limited by association of a duration of validity with the personal authentication data. In this case, it may be provided for the memory module to comprise an electrical capacitance such that the duration of validity associated with the personal authentication data is accounted for by the discharge of the electrical capacitance provided in the memory module.

In particular moreover, the memory module may comprise a volatile memory storing the personal authentication data and temporarily powered by said electrical capacitance.

According to still another embodiment, the memory module may comprise a volatile memory which is continuously powered during the control of the execution of the protected function or a re-writable memory, which memory stores the personal authentication data. In this case, the memory module is configured to associate a duration of validity with those personal authentication data by storing a temporal quantity in a variable which is associated in memory with those same personal authentication data.

The invention also concerns an electronic entity comprising:
  at least one communication interface for receiving personal data input by a user and a message to process,
  a memory which stores, in a limited validity data structure, personal authentication data which are dependent on the input personal data,
  a means for limiting, in time or space, the validity of the data structure storing the personal authentication data, and
  a means for verifying the validity of the limited validity structure before using the personal authentication data that it contains to generate an authorization or a refusal to execute a function protected by authentication and implemented in the processing of the received message.

In particular, the entity may be of microprocessor card type.

The electronic entity has similar advantages to those of the method, of the memory module and of the system set forth above.

Optionally, the electronic entity may comprise means relating to the features of the method set forth above, and in particular means implementing a duration of validity, such as a electrical capacitance or a variable in memory, and a memory whether volatile or not.

BRIEF DESCRIPTION OF THE DRAWINGS

Other particularities and advantages of the invention will appear in the following description, illustrated by the accompanying drawings, in which.

DETAILED DESCRIPTION OF THE INVENTION

Figure 1:
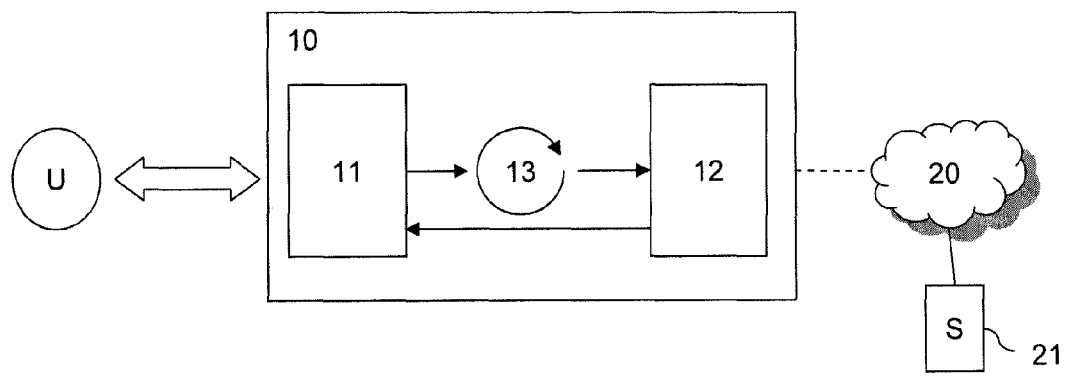
FIG. 1 illustrates conventional mechanisms for authentication of a user U for accessing a resource.

FIG. 1 illustrates conventional mechanisms for access to a resource by a user U, for example for accessing a payment service at a retailer.

These operations require the interaction between a user U and a payment terminal 10. This interaction consists in particular in the input of personal data for identification or authentication which are sensitive to possible attacks, using a keyboard or any other type of input means 11. By way of illustration, these sensitive personal data may be a password, a PIN number (PIN standing for "Personal Identification Number") or biometric data enabling a person to authenticate himself and to enable a financial transaction with the retailer to be made.

Other non-sensitive data may also be input at that time, for example a total indicated by the user for the financial transaction with the retailer.

A message ordering a financial transaction and comprising those input data, is then provided to a processing software application 12.

The message comprises in particular a command for the financial transaction.

The execution of that command depends in particular on the presence of requisite rights specific to that command, in this case a valid authentication produced by validation of the input personal data.

Using conventional mechanisms and generally by comparison with pre-recorded data, the software 12 verifies the personal data input by the user for generating an authorization or refusal to execute the financial transaction. For example, the PIN input by a user U may be compared to a PIN stored in a payment card inserted into the payment terminal 10.

In case of positive authentication, the execution of the financial transaction command is authorized enabling the access to the payment service S. Exchanges with a payment server (symbolized here by the network 20 and the server 21) are then conducted.

In case of negative authentication, the financial transaction cannot be carried out.

In this context, attacks by the man in the middle utilize a malicious software application 13 as represented diagrammatically in the Figure. The malicious software 13 intercepts the input data, whether or not they are sensitive, copies them and transfers them to the software 12. The intervention of the malicious software 13 is thus transparent for the user and for the software 12.

Figure 2:
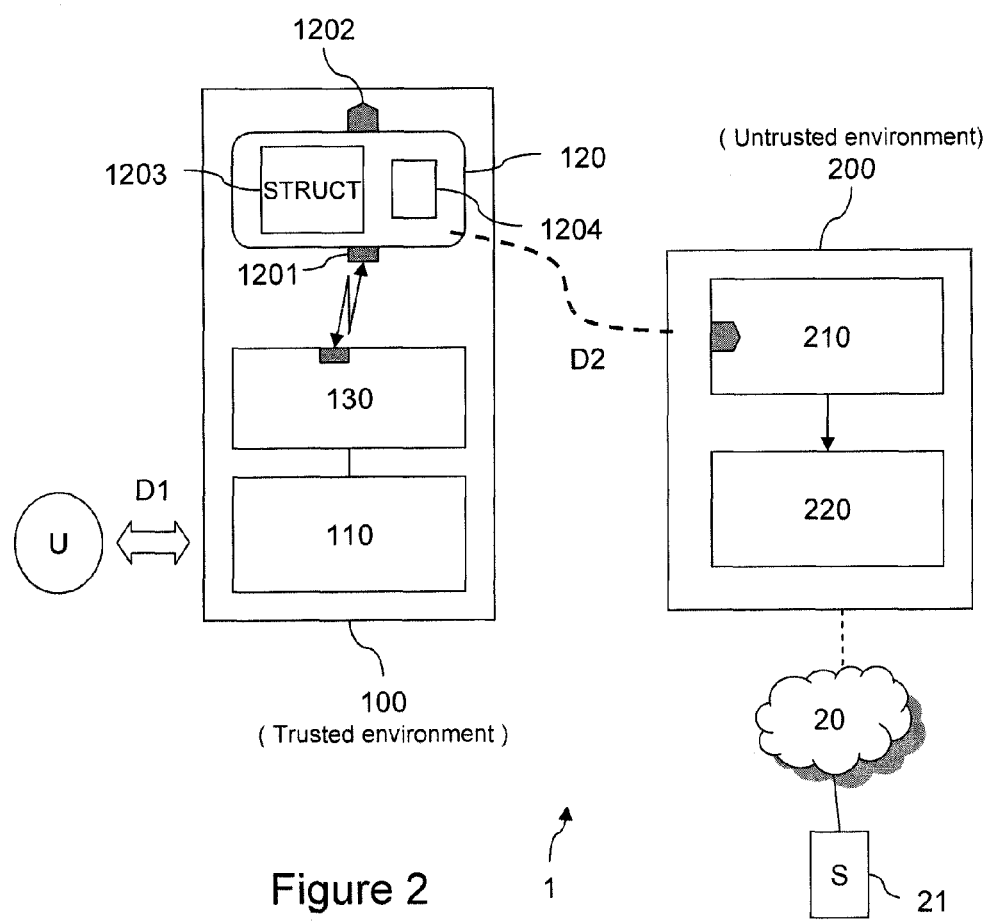
FIG. 2 is a diagram of an implementation of the invention.

FIG. 2 is a diagram of a system 1 implementing the invention according to one embodiment. The user U must make the same inputs (of sensitive data and possibly of non-sensitive data) as conventionally for the use of commands protected by rights relative to an authentication.

In the system of FIG. 2, the user U interacts with a first input device 100. This device is preferably a trusted device, that is to say a device of the user U himself, for example his mobile telephone or his computer.

The input device 100 comprises an input interface 110, a secure microprocessor card 120 and an embedded microprocessor card reader 130. Other conventional functionalities of a mobile telephone may be provided in the input device 100, without them being described here however. In particular internal means for powering the device 100 (a battery for example) as main electrical source enable the microprocessor card 120 to be powered.

The input interface 110 may take the form of a conventional telephone keypad, for example for the purposes of inputting a PIN code or a password. As a variant or in combination, it may comprise a biometric sensor adapted to acquire biometric data specific to the user U, or any other interface.

The embedded reader 130 may equally well be contactless or with contact for reading from and/or writing to the microprocessor card 120. It is linked to the input interface 110 via a conventional electronic system architecture, for example via a data bus and a microprocessor (not shown).

The microprocessor card or "smart card" 120 is preferably a removable card personal to the user U, for example in ID-1 format, which the user can easily extract from the input device 100 to present it to another microprocessor card reader 210 of a processing device 200, as described below. As a variant, the microprocessor card 120 may be physically attached to the input device 100 during the entirety of the operations for access to the resource S, that is to say during the input, the control of the access command protected by the authentication and the exchanges during the access.

In both these cases, and in particular when it is physically attached to the input device 100, the microprocessor card 120 may be replaced by a simpler memory module provided with a memory and a microcontroller or processor, for the implementation of the operations according to the invention. The memory may be volatile or not as explained below.

The microprocessor card 120 comprises a contactless interface 1201 for communication with the contactless reader 130 of the device. The microprocessor card 120 also comprises a contactless interface 1202 for communication with the contactless reader 210 of the processing device 200 In particular, these two interfaces are combined into a single interface. They may however be distinct, for example one being with contact and the other contactless.

As will be seen later, they enable the microprocessor card to receive the data input by the user on the input device 100 and to receive a message from the processing device 200 in response to an action by the user thereon, the processing of that message in particular implementing the access command protected by authentication, either because it contains it directly, or because it calls such a command which is internal to the microprocessor card.

The microprocessor card 120 also comprises a memory 1203 enabling a data structure STRUCT to be stored as described below, as well as means 1204 making it possible to define a validity parameter for said structure, for example a duration of validity DV or a geographical zone of validity. For the following explanations, reference will mainly be made to a duration of validity. Similar mechanisms to those described below may however be implemented for a geographical validity.

The microprocessor card 120 is configured for generating and storing, in its memory 1203, when it is connected to the input device 100, limited validity personal authentication data which are dependent on personal data input by the user and for associating with them a duration of validity, for example via said structure.

As described below through different examples, the means 1204 may define such a duration of validity DV explicitly or implicitly depending on the properties of the architecture that is adopted.

The duration of validity DV is associated with the structure STRUCT to define a temporal limit of validity therefor.

This duration is dependent on a desired level of security, which varies from one application to another. By way of example, for a protected financial transaction command made secure by PIN code, that duration may be set at a few tens of seconds, for example 1 to 2 minutes. For a command for secure access to a computer or communication network, it may be longer, of the order of a few minutes, for example 5, 10 or 15 minutes.

In an embodiment, the memory 1203 is a volatile memory.

The memory 1203 may then be continuously powered by a main power supply (battery of the device 100), in particular when the card 120 is not extracted from the input device 100 for the whole of the operations of access to the resource. In this case, the means 1204 may consist of a variable in memory defining the duration of validity DV of the data structure STRUCT starting from its generation (that is to say from its creation and/or from its updating), as described below, or defining a validity end time, or a validity start time if the duration from that time is prefixed.

If the card 120 is configured to be extracted from the input device 100 to be presented to the processing device 200, the volatile memory 1203 may, when the main power supply has been disconnected, be temporarily powered by an evanescent internal source of electricity, for example an electrical capacitance charged from the main power supply when the card 120 is in position in the input device 100.

The evanescent internal source stands in as means 1204 since it is able to maintain the power supply of the volatile memory (which empties when all the power has been cut off) for a duration which depends on its properties (in particular the value of its capacitance).

In particular, in the case of an electrical capacitance, the capacitance value is chosen on the basis of the desired duration of validity DV. In case of total discharge of the capacitance, the data structure STRUCT present in the memory 1203 is then automatically erased. Mechanisms for controlling charge and discharge of the capacitance make it possible to provide the countdown of the duration of validity starting from a desired precise time, in particular when the card 120 is extracted from the input device 100 or when the data structure STRUCT is generated, and possibly to continue the countdown when the card 120 is again powered by the processing device 200.

For example commands for controlling the capacitance may be provided and used by the card 120 for controlling that duration of validity DV. In particular, a charging command may be provided for charging the capacitance and implicitly triggering the start of the countdown of DV at the end of charge, a discharging command may be provided for discharging the capacitance so as to force a state of invalidity for the data structure STRUCT, and a charge level command in order to know the level of charge of the capacitance and thus directly determine whether or not the duration DV has expired.

This case generally may apply to any memory adapted to preserve data only for a certain time (which implicitly defines the duration of validity DV).

In another example, the volatile memory 1203 chosen may have properties of evanescence (in particular a duration of evanescence) that are compatible with the desired duration of validity DV. In this case, the means 1204 is formed by those properties of evanescence, since the cutting off of the power to the memory 1203 (in particular on extraction of the card 120 or at a command to end memory power supply), the data structure STRUCT remains in the memory 1203 until expiry of the evanescence duration. Controls enabling the power supply and end of power supply to that memory are provided in this connection.

In another embodiment, the memory 1203 is a re-writable memory, in which case the means 1204 may consist of a variable in memory defining an item of temporal information, for example the duration of validity DV of the data structure STRUCT as from its creation or updating, a date and time of end of validity, or a date and time of start of validity if a prefixed duration is agreed in advance. As a variant, even if the memory is re-writable, the means 1204 may be formed using an evanescent internal source (for example an electrical capacitance) which is dedicated therefor, charged by the main power supply, and which discharges as from the end of charging following on from the reception of a charging command. In this case, so long as the electrical capacitance has not fully discharged, the structure STRUCT is considered as valid.

In the particular case of a geographical validity (which may moreover be provided as a complement of a temporal validity as described above), a zone of validity may be defined around an initial point, for example the location of the card 120 at the time at which the structure STRUCT was created. This remains valid within that zone. In particular adapted means may be provided for definitively erasing the structure (or for making it definitively invalid) as soon as a departure from that zone has taken place. As a variant, any return into the zone after a departure may again make the structure valid.

The adapted means may combine a GPS receiver capable of computing distances relative to the initial point, a threshold distance delimiting the zone (for example a radius), and a memory provided with means for erasure as soon as the current distance exceeds the threshold distance.

As indicated previously, an implementation of the invention consists, for the user U, of inputting personal data for identification or authentication, that is to say sensitive personal data D1, by means of the input device 100. As a complement, the user U may also input other data (possibly not sensitive) that are necessary for the access and/or for performing the service S which the user wishes to access, for example the total of a financial transaction, the name of a file to retrieve, a date, etc.

This input action leads to updating data or a status that are internal to the microprocessor card 120, in a data structure STRUCT which can be created at that time. A duration of validity is then associated with it at that time, using one of the means referred to earlier.

The data structure STRUCT may, without being limited thereto, be a simple electronic file, a list, a tree, a graph, a database, etc.

As will be seen in the following examples, the data structure STRUCT may directly store, as personal authentication data D2, the personal data input by the user U, without any processing being carried out on those data.

As a variant, the input device 100 may perform pre-processing thereof to produce other personal authentication data D2 dependent on those input personal data. By way of example, the verification of a PIN code input by the user U is made by the input terminal 100, here the mobile telephone of the user U, and an item of information representing the result of its comparison with a reference PIN code (and not the input PIN code itself) is stored in the data structure STRUCT (possibly with other data necessary for performing the desired service S). This result, for example a single bit or a Boolean function, is a result of authenticating the user.

Within the card 120, the data structure STRUCT is secure. More particularly, in a conventional manner the card 120 implements numerous mechanisms enabling the confidentiality of the data it stores to be ensured.

Once the data structure STRUCT has been created and updated, the user U disconnects the microprocessor card 120 from the device 100, the effect of which is to trigger the countdown of the duration of validity DV if this has not already taken place (in case of triggering for example as of the end of charging of the capacitance further to a charging command or when the duration DV is stored via an item of temporal information in memory).

The user U then connects the card 120 to the processing device 200, for example by introducing the card at a location provided for that purpose, equipped with a card reader. The effect of this connection is of course not to stop the countdown of the duration of validity. In particular, in the case of the use of a capacitance, this countdown is not stopped since a specific charging command would be required to be issued to recharge it.

The processing device 200 is conventionally a device of low trustworthiness and not secure, typically a third party payment station/terminal, a cash dispenser, an Internet service, etc.

As represented in the Figure, the processing device 200 comprises reader 210 for a microprocessor card (or a memory according to the case) which is compatible with the communication interface 1202 of the card 120, and comprises a processing module 220. The processing device 200 also comprises a user interface (not represented) enabling the user to interact with the equipment in particular to access a desired resource.

The processing module 220 thus controls the exchanges with the card 120 to perform that access to the desired resource, and in particular sends it a message for access to the resource. The message may comprise a command C protected by authentication or call a function, routine or command C', also protected by authentication, implemented in the card 120.

It is then the microprocessor card 120 which controls the execution of the protected command, by authentication of the user U using the personal authentication data D2 that it stores in the limited validity structure. This control makes it possible to authorize or not authorize the execution of the protected command, function or routine, and thus the access or not to the desired service S. Below, reference will mainly be made to a "protected command" to designate those commands, functions or routines that are protected by authentication.

Depending on the associated duration of validity DV, the microprocessor card 120 is thus configured to use, when connected to the processing device 200, the stored personal authentication data D2 for generating the authorization or the refusal to execute the protected command that it has received.

In this way, the data structure STRUCT serves as an interface between the input of sensitive data on the device 100 and their use at the time of the access to the service S using the device 200.

The invention also applies to the access to services/resources local to the processing device 200 (for example a functionality of that device or of data that it stores), without requiring access via a computer network 20 as represented in the Figure.

At the time of the control of the execution of the protected command by authentication of the user, the microprocessor card 120 takes into account the duration of validity DV associated with the structure STRUCT for using or not using the personal authentication data D2 that it contains.

Thus, when the user generates, on the processing device 200, the command C/C' for protected access to a service requiring involvement of the card 120 to verify the rights demanded, the validity of the structure STRUCT is first of all verified by the card on reception of the command.

If the duration of validity is explicit (indication of the end of validity time for example), the card 120 verifies that the duration has not expired, in particular by using the clock of the processing device.

If it is implicit (use of an electrical capacitance for example), the card 120 verifies whether the capacitance is fully discharged or not. This may be carried out for example using a capacitance charging level command, or may be obtained by attempting to access the data structure STRUCT in the volatile memory if the latter is powered by the capacitance or if the memory remanence properties are used. More particularly, in these cases, if the capacitance is fully discharged or the duration of remanence has expired, the data structure is erased.

In case of validity of the data structure STRUCT, the personal authentication data D2 are accessed, enabling the card 120 to verify the rights demanded, for example whether or not the entered PIN code is correct. The verification of the rights generates an authorization or refusal to execute the protected command in question, and thus of accessing the desired service or not.

The control according to the invention thus enables secure access to be obtained to a great number of services provided by the processing device 200, via the card 120: financial transaction, digital signature, consultation of accounts, access to data, etc., while avoiding fraudulent exploitation of sensitive data input by a user.

The input 100 and processing 200 devices, as well as the microprocessor card 120, comprise hardware and software means configured to implement the different steps and operations described here.

Below, examples will be referred to in which the execution of a command C directly indicated in the message provided by the processing device is dependent on the successful authentication of the user using the personal authentication data contained in the limited validity structure STRUCT.

However, as mentioned above, a command, function or routine protected by authentication may be implemented on processing the message, without it being explicitly indicated in the message.

It may moreover be noted that the invention is not affected by whether or not the personal authentication data stored in the structure STRUCT influence the result yielded by the card 120 in response to the command C. By way of example, the response to the command C may be the value of the stored personal authentication data (for example the result of the stored authentication is yielded). In another example, the yielded value may depend on the value of the personal authentication data (for example if one sub-command C' from among several is not executed, the result may change). Lastly, in another example, the result yielded is independent of whether or not the command protected by the aforementioned authentication is executed (for example the execution of that command enables an internal indicator of the card 120 to be updated).

Figure 3:
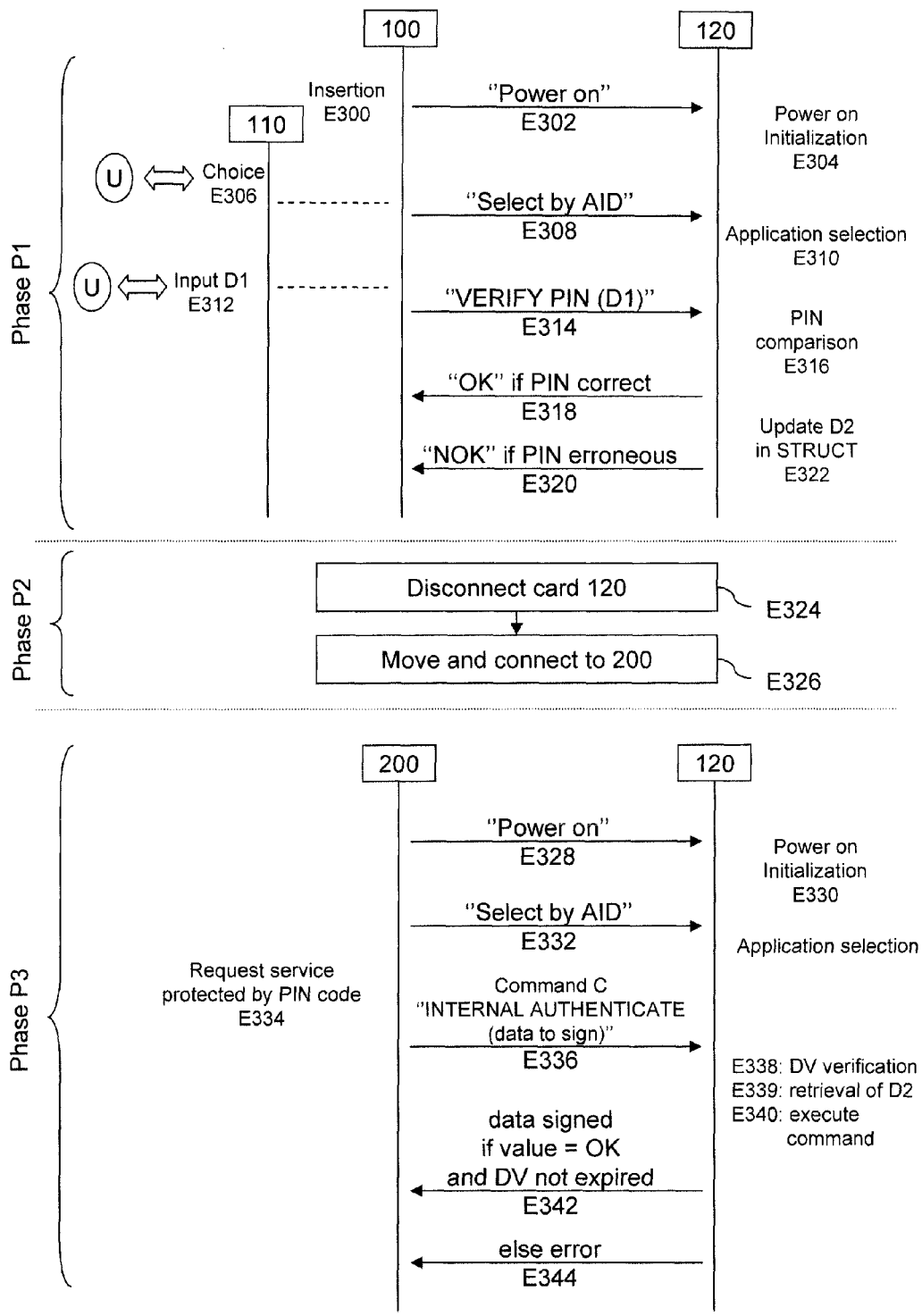
FIGS. 3 to 5 illustrate three examples of access to a digital signature service protected by the authentication according to the invention.

FIG. 3 illustrates a first example of access to a digital signature service according to the invention.

In this example, the card 120 storing the structure STRUCT is removable. Furthermore, the means 1204 is implemented via an electrical capacitance provided in the card 120 to temporarily power the volatile memory 1203. Furthermore, the data D1 input by the user U are pre-processed on the input device 100 before storage of the result in the structure STRUCT. Thus, in a first phase P1 commencing at step E300, the removable microprocessor card (or memory module) 120 is inserted into the input device 100, here the user's mobile telephone.

This insertion leads to a signal of powering up E302, triggering the powering up of the microprocessor card 120 and its initialization E304 according to conventional mechanisms. At this stage, the microprocessor (not represented) and the memory 1203 of the card 120 are powered by a main power supply source (the battery of the telephone for example).

For the purpose of the implementation of a service S desired by the user U, the user selects a pre-processing application via a menu and the interface 110, for the access to the service (E306).

A command for selecting the application is then generated (E308) by the input device 100 destined for the card 120. This selection command "Select" is in accordance with the ISO/IEC 7816-4 standard for communication between a microprocessor card 120 and a card reader 130 (here equipping the device 100).

The selected application is then executed (E310) in the card 120, requiring the input of an item of personal data D1 for identification or authentication of the user U and possibly complementary data necessary for the desired service. In the example, the user U inputs, via the interface 110, his PIN code (E312).

A PIN code verification command "VERIFY PIN" in accordance with the aforementioned standard ISO/IEC 7816-4 is then supplied (E314) to the card 120. This command comprises the PIN code input by the user U.

In a conventional manner, the card 120 retrieves the input PIN code, then compares it with a reference PIN code pre-recorded in secure memory of the card 120 (E316) so as to generate a positive response OK in case of correct PIN (E318) and a negative response NOK in case of erroneous PIN (E320).

In parallel manner, the card 120 updates (creates if necessary) the data structure STRUCT by inserting therein the result of the comparison E316 (and possibly the complementary data that it has received), at a step E322. This result of the comparison is, here, named "personal authentication data" D2 of the user.

At the same occasion, the card 120 provides the duration of validity DV associated with the data structure and thus with the personal authentication data D2, by sending a command for charging the capacitance 1204. The duration DV is counted down for example starting from the end of charging of the electrical capacitance 1204, by progressive discharge of that capacitance.

These actions of step E322 may for example by performed by a control program as follows:

```
if PIN OK{
    charge 1204;
    provide OK to STRUCT;
}
else{
    discharge 1204;
    provide NOK to STRUCT;
```

At a second phase P2, the user U terminates the main power supply of the card 120 by the input device 100, by extracting the card 120 in particular, at step E324.

By virtue of the capacitance 1204 in course of discharging, the volatile memory 1203 remains temporarily powered and the data (in particular STRUCT) that it stores are still valid. If the card 120 is not re-used before the expiry of the duration DV (thus before the complete discharge of the capacitance), the volatile memory and thus the structure STRUCT are erased.

At step E326, the card 120 is physically moved towards the processing device 200 to which it is then connected.

The third phase P3 then commences by step E328 of commanding the powering up of the card (similar to E302), leading to the powering up and initialization of the card 120 (E330—similar to E304).

A selection command destined for the card 120 is then generated (E332) in similar manner to step E308.

At step E334, the user seeks a PIN code protected service (here the computation of a digital signature) on the processing device 200. This detection triggers the sending of a command C "INTERNAL AUTHENTICATE" in accordance with the ISO/IEC 7816-4 standard (step E336). This command is parameterized with the data to sign and its execution is, according to the standard, dependent on the successful execution of prior commands, for example a prior valid authentication as provided in the present example.

By virtue of the invention, the condition of validated PIN code (or not validated as the case may be) is present in the structure STRUCT of the card 120 via personal authentication data D2, without the user U having to input his PIN code to the processing device 200.

At this stage, step E338 on the card 120 consists in verifying the validity of the structure STRUCT, taking into account the associated duration of validity DV.

This verification may in particular consist in verifying the level of charge of the capacitance 1204 (using an appropriate command) and/or the presence of the structure STRUCT in the memory 1203. To be precise, if the duration of validity has expired (the capacitance 1204 has fully discharged) while the card 120 was no longer powered, the volatile memory 1203 has become erased and the condition of validated PIN code is no longer available.

If the duration DV has expired, the structure STRUCT may be marked as invalid (for example via one bit) in order to simplify step E338 at the time of later access requests.

If the duration DV has not expired and thus the structure STRUCT is indeed valid, at step E339, the personal authentication data D2 are retrieved from the structure STRUCT.

At step E340, the command C "INTERNAL AUTHENTICATE" is executed taking into account the retrieved personal authentication data D2, as required rights. It is thus executed solely if those data D2 reveal a condition of validated PIN code.

For example, a particular function COPY D2 may be executed by the card at this step to copy the data D2 into a global variable conventionally used to store the result of the authentication by PIN and which is accessed by the execution of the INTERNAL AUTHENTICATE command. Thus, the latter is not modified.

Of course, as a variant, a VALIDATE PIN OK function may be called to directly verify whether the condition of validated PIN code is indeed present, and in that case to directly authorize the execution of the INTERNAL AUTHENTICATE command.

In the case of a condition of validated PIN code, the signature of the data to sign, using a key that is internal to the card 120, is carried out.

Due to this, the digital signature of data (or the access to the resource/service) is protected by a positive verification of the data D2.

The card 120 then sends, to the processing device 200, a response to the command: the signed data (E342) or an error message (E344) depending on whether it had been possible to execute the command or not.

Figure 4:
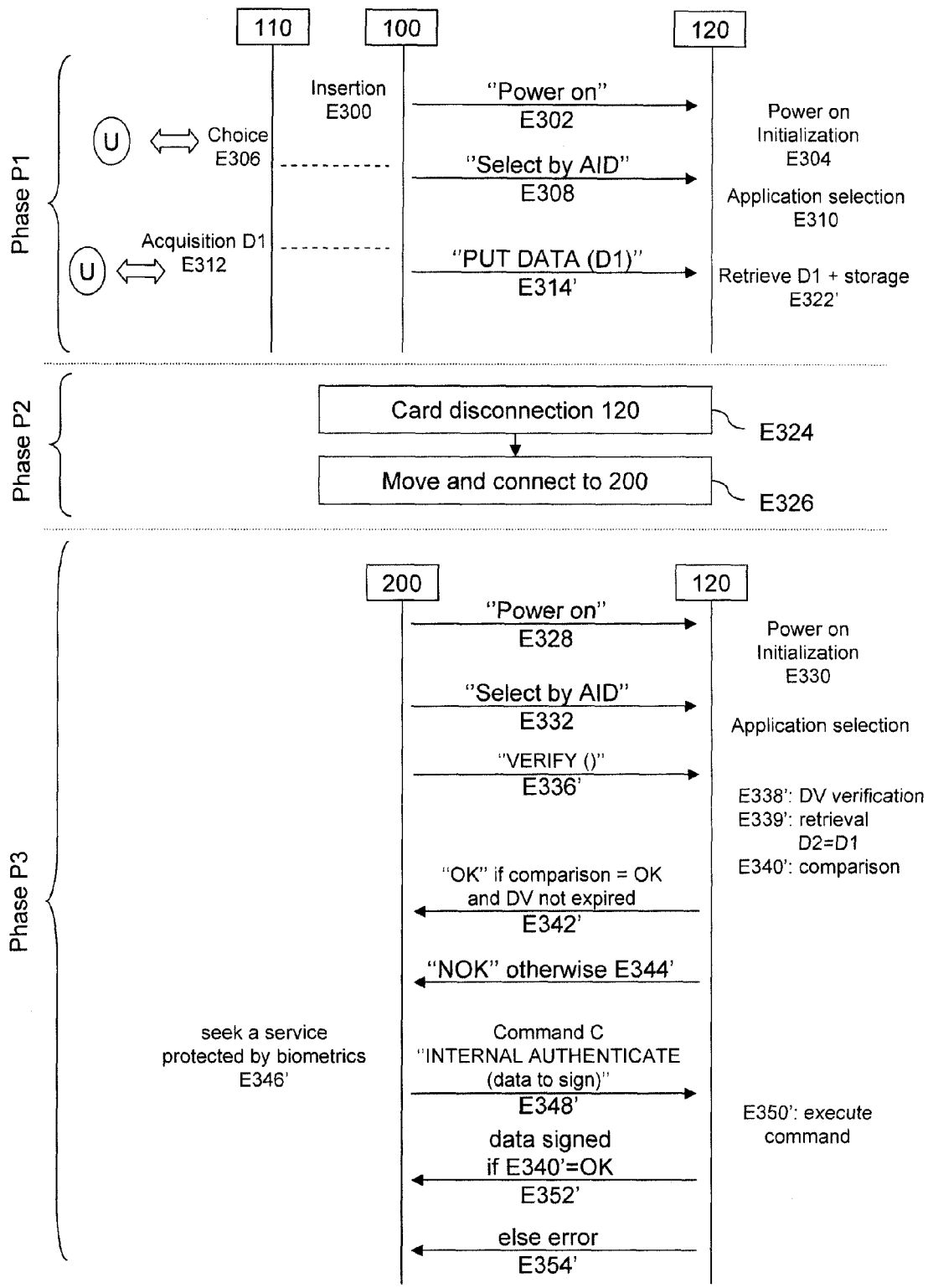

FIG. 4 illustrates a second example of access to a digital signature service according to the invention and which is substantially similar to that of FIG. 3, apart from the fact that the personal data D1 as input by the user U are directly stored (without modification) in the structure STRUCT.

Furthermore, instead of inputting the PIN code, this example implements the acquisition of a biometric measurement of the user U, for example a fingerprint.

In phase P1, the steps E300 to E312 are similar to those described with reference to FIG. 3, apart from the fact that the user U is requested to acquire a fingerprint rather than a PIN code.

At step E312 consisting in inputting the sensitive data D1 by the user U, the latter presents a finger to the biometric sensor 110 so as to acquire personal data D1 for identification that represent the fingerprint.

These sensitive data D1 are provided to the card 120 through a "PUT DATA" command in accordance with the ISO/IEC 7816-4 standard (step E314').

In the card 120, these data D1 are retrieved and then stored directly in the data structure STRUCT (step E322').

Of course complementary data may be input/acquired by the user U and stored in addition in the structure STRUCT.

At this stage, the countdown of the duration of validity DV may be triggered, by the command for charging the capacitance 1204.

Further to phase P1, phase P2 is similar to that of FIG. 3, i.e. comprising the steps E324 and E326.

Phase P3 commences in the same way as the same phase of FIG. 3, with in particular steps E328 to E332.

The processing device 200 may be configured to send, on detection of the card 120, a command for processing the data D1 stored in the structure STRUCT (step E336'), in the example a command for verifying the fingerprint with a reference fingerprint pre-recorded in memory of the card 120.

It is to be noted that this verification may be carried out on the card 120 in response to the command C protected as provided below, without having recourse to this prior command E336'.

At step E338', the validity of the structure STRUCT is verified with regard to the associated duration DV.

If the structure is no longer valid, it is indicated as such and a negative response NOK (E344') is sent back to the processing device 200.

If the structure is valid, the data D1 are retrieved from the structure STRUCT at step E339'.

The fingerprints D1 acquired in phase P1 are then compared (E340') to reference fingerprints.

The result of the comparison, correct OK (E342') or incorrect NOK (E344'), is returned to the processing device 200.

In parallel, the result of the comparison is stored in a global variable (of the card), conventionally used for storing the result of the authentication by biometric data, and accessed by the execution of a later protected command such as INTERNAL AUTHENTICATE.

As a variant, this result may be directly stored in the data structure STRUCT as valid or erroneous biometric data condition.

At step E346' the processing device 200 detects that the user U is seeking a service (here the computation of a digital signature) protected by biometric authentication and thus requiring authentication of the user. This service request triggers the sending of a command C "INTERNAL AUTHENTICATE" in accordance with the standard ISO/IEC 7816-4 (step E348'), having as parameter the data to sign and being protected by authentication of the user.

The card 120 then executes (E350') the command C "INTERNAL AUTHENTICATE".

It is to be noted that if at step E340' the result of the comparison is stored in the conventional global variable, step E350' is still conventional, the command INTERNAL AUTHENTICATE being conditional on the presence of a validated condition in that global variable.

In the case of the variant, a function VALIDATE DATA OK may be executed to verify in the structure STRUCT the presence or absence of the validated condition, and consequently authorize or not authorize the command INTERNAL AUTHENTICATE.

Where appropriate the data to sign are signed using an internal key of the card 120, according to conventional mechanisms.

The card then sends a response to the command INTERNAL AUTHENTICATE, destined for the processing device: the signed data (E352') or an error message (E354').

Once again, the digital signature of the data (or the access to the resource/service) is protected by a positive verification of the biometric data.

Figure 5:
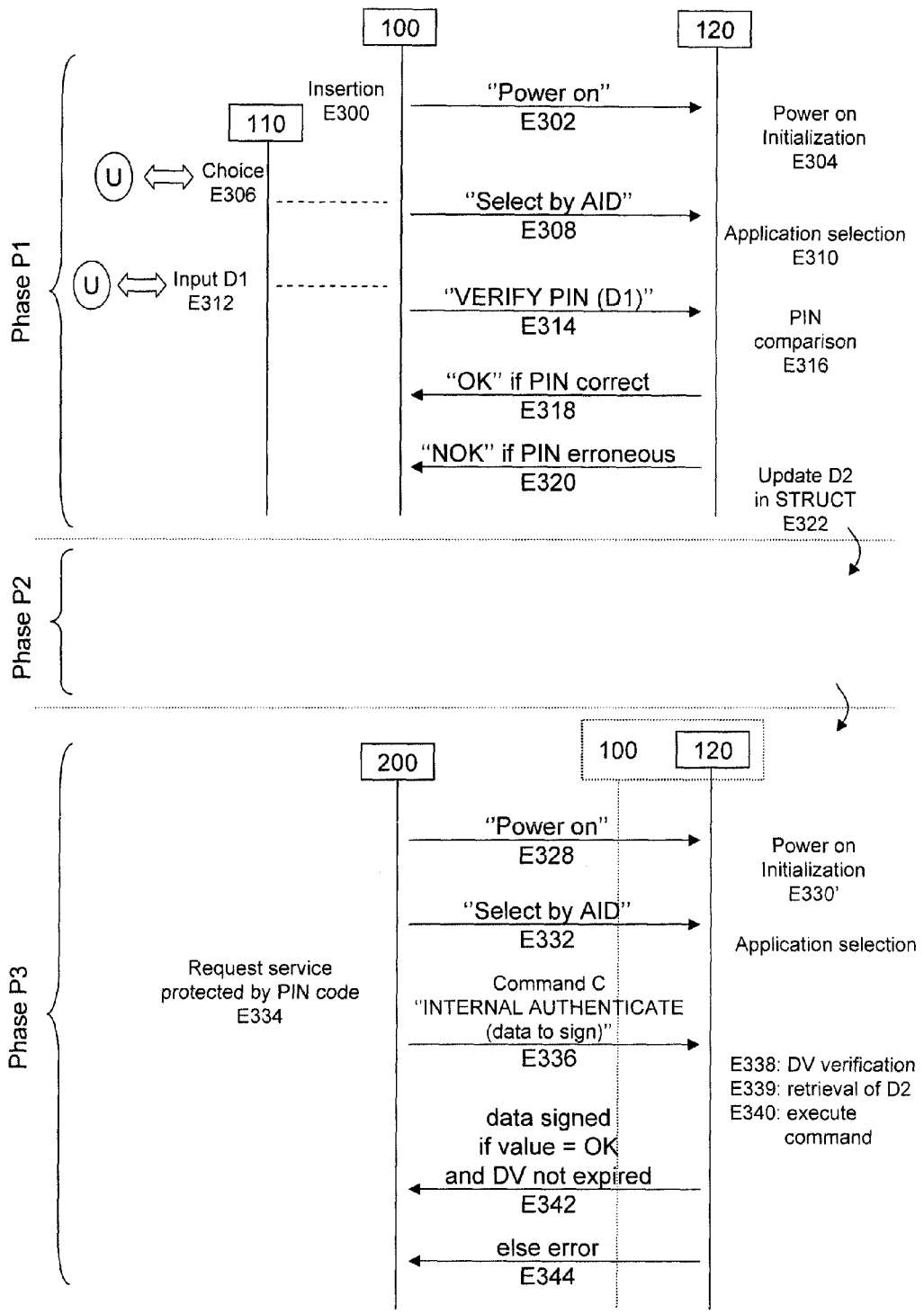

FIG. 5 illustrates a third example of digital signature according to the invention substantially similar to that of FIG. 3, in which the card 120 storing the structure STRUCT is permanently accommodated in the input device 100 (at the very least during the entirety of the operations described below corresponding to the whole of the process of authentication of the user U). This is for example the case for a SIM card in a mobile telephone.

In this case, the steps E300 to E322 of phase P1 are identical to the steps of phase P1 of FIG. 3.

As for phase P2, this is empty since there is no physical dissociation between the card 120 and the equipment 100. This phase P2 thus commences as soon as the input personal data for identification D1 have been processed by the card 120 under the command of the input device 100, that is to say as soon as the data structure STRUCT has been generated with the data D2 resulting from the processing. Similarly, countdown of the duration of validity commences as of the end of this processing, by the charging of the capacitance 1204 for example.

During phase P3, the group {input device 100—card 120} communicates with the processing device 200, for example, with the aid of a contactless communication protocol (NFC or equivalent).

It is to be noted that according to one embodiment, the processing device 200 may directly communicate with the card 120. This is the case in the example of FIG. 2, where the communication interface 1202 enables direct communication with the equipment 200. It is to be noted that if two communication interfaces 1201 and 1202 are united, it is provided to deactivate the reader 130 of the input device 100 in order to enable communication of the card 120 with processing device 200 without interference. Otherwise means for differentiating the communications with each of the interfaces 1201 and 1202 may be provided.

In a variant, the processing device 200 may communicate with the input device 100 which then supplies the information and requests to the card 120. In this case the card 120 may be equipped with a single interface 1201 for communication with the reader 130.

FIG. 5 illustrates phase P3 in the case in which the processing device 200 communicates directly with the card 120.

The initialization of the communication between these two entities is carried out during conventional exchanges of messages, represented in the Figure by step E330'.

Following steps E332 to E344 are similar to the steps bearing the same references of FIG. 3.

Of course, the different embodiments referred to above prior to the three examples of FIGS. 3 to 5 may be applied to each of those examples, for example for modifying the means 1204, the nature of the memory 1203, the communication interfaces 1201 and 1202, to replace the microprocessor card 120 by a memory module provided with a microcontroller enabling communication with the readers 30 and 210, etc.

The preceding examples are only embodiments of the invention which is not limited thereto.

In particular, although the invention has been illustrated above for the access to a digital signature service, it may equally well be applied to the access to stored data or to other resources.

For example personal data (biometric, photograph or identification) are stored in an electronic passport but which is accessible uniquely after authentication. Using a mobile telephone, the user may pre-authorize the access to those data by inputting a PIN code generating a limited validity structure STRUCT with the validated/erroneous PIN code condition, by the mechanisms according to the invention.

The customs official may thus access the personal data by virtue of this pre-authorization during the duration of validity DV.

The invention claimed is:

1. A method of controlling the execution of a protected function protected by authentication, the method comprising:
  establishing communications between a memory module and an input device;
  inputting, by a user, personal data using the input device connected to the memory module;
  storing, in a data structure on said memory module in communication with the input device, personal authentication data derived from the personal data input by the user via the input device, and associating with said data structure a duration validity parameter configured to become invalid upon elapse of a predetermined amount of time;
  establishing communications between the memory module and a processing device that is distinct from the input device, said processing device communicating with the memory module by contactless communication;
  verifying, via the processing device, a validity of the duration validity parameter of the data structure in the memory module in communication with the processing device;
  upon successful verification of the validity of the duration validity parameter of the data structure in the memory module connected to the processing device, authenticating the user based on the input personal data using the personal authentication data derived therefrom and stored in the data structure;

upon successfully authenticating the user based on the input personal data, generating authorization to execute the protected function and executing the protected function; and upon unsuccessfully authenticating the user based on the input personal data, generating a refusal to execute the protected function, wherein the memory module storing the data structure is physically linked with an input device during the control and execution of the protected function.

2. The method according to claim 1, wherein generating the authorization or the refusal is dependent on a verification of the personal data input with reference data, the result of the verification being obtained using said personal authentication data stored in the data structure.

3. The method according to claim 1, further comprising comparing the input personal data with personal data pre-recorded in the memory module,
wherein the personal authentication data stored in the limited validity structure comprise the result of the comparison.

4. The method according to claim 1, wherein the personal authentication data stored in the data structure comprise the input personal data, and use of the personal authentication data comprises comparing the personal authentication data stored in the data structure with pre-recorded personal data.

5. The method according to claim 1, wherein said data structure comprises personal authentication data of validity limited by association of the duration validity parameter with the personal authentication data, and
the duration validity parameter associated with the personal authentication data is accounted for by discharging an electrical capacitance.

6. The method according to claim 5, wherein the personal authentication data are stored in a volatile memory, temporarily powered by said electrical capacitance.

7. The method according to claim 1, wherein the personal authentication data are stored in a volatile memory of a memory module, which is continuously supplied with power during the control of the execution of the protected function or in a re-writable memory, and the duration validity parameter associated with the personal authentication data is defined by storing a temporal quantity in a variable which is associated in memory with the personal authentication data.

8. The method according to claim 1, wherein the protected function is a command implemented, on reception of a message from the processing device, by a microprocessor module storing the data structure.

9. The method according to claim 1, wherein the memory module storing the data structure is a secure microprocessor card.

10. The method according to claim 1, wherein the processing of the message from the processing device generates a response comprising at least one response value which depends on the authorization or the refusal generated.

11. The method according to claim 1, wherein the input device is a mobile telephone of the user.

12. A memory module comprising at least one memory and a microprocessor for executing instructions, the memory module being configured for:
storing, in a data structure having a validity limited in time, personal authentication data which are derived from personal data input by a user and received from an input device to which the memory module is linked; and
verifying a validity of a duration validity parameter associated with the data structure before using the personal authentication data stored within the data structure, thereby to generate a refusal to execute a protected function that is protected by authentication and implemented in processing of a message received from a processing device that is distinct from the input device in the event that the data structure is determined to be invalid due to elapse of a predetermined amount of time based on the duration validity parameter,
wherein the memory module storing the data structure is physically linked with the input device during control and execution of the protected function, and the processing device communicates with the memory module by contactless communication.

13. A system for controlling the execution of a protected function protected by authentication of a user, the system comprising:
an input device for inputting personal data by the user;
a processing device that is distinct from the input device and adapted to generate, under the action of the user, a message to be processed;
a memory module comprising a memory and a microprocessor, and which is configured to authenticate the user based on the input personal data so as to generate one of i) an authorization to execute the protected function implemented in the processing of said message and ii) a refusal to execute the protected function;
wherein the memory module is configured to:
when the memory module is connected to the input device, generate and store, in the memory, personal authentication data derived from the personal data input via the input device;
associate with the personal authentication data a duration validity parameter configured to become invalid upon elapse of a predetermined amount of time; and
when the memory module is connected to the processing device, use the stored personal authentication data to generate the one of the authorization and the refusal, depending on a validity of the associated duration validity parameter,
wherein the memory module, when connected to the processing device and upon receiving a request from the processing device for authorization to perform the protected function, verifies the duration validity parameter in view of the associated duration validity parameter before accessing the personal authentication data stored within the memory, such that in the event the duration validity parameter is invalid due to elapse of the predetermined amount of time, authorization is refused for carrying out the protected function,
wherein the memory module storing the data structure is physically linked with the input device during control and execution of the protected function, and the processing device communicates with the memory module by contactless communication.

14. An electronic entity, comprising:
a communication interface that receives personal data input by a user and receives a message to be processed from a processing device in communication with the communication interface by contactless communication;
a memory which stores, in a data structure, personal authentication data derived from the personal data received via the communication interface, said data structure having associated therewith a duration validity parameter;

a means for limiting a validity of the data structure storing the personal authentication data, such that the duration validity parameter associated with the data structure is rendered invalid upon elapse of a predetermined amount of time; and a means for verifying the validity of the duration validity parameter of the data structure before accessing the personal authentication data stored within the data structure, thereby to generate a refusal to execute a protected function that is protected by authentication and implemented in processing of the message, in the event that the data structure is determined to be invalid due to elapse of the predetermined amount of time, wherein the memory means that stores the data structure is configured to be physically linked with an input device during the control and execution of the protected function.

15. The method according to claim 1, wherein the memory module storing the data structure is a secure microprocessor card.

* * * * *